UNITED STATES PATENT OFFICE 2,466,508

BERYLLO-ALUMINATE GLASS

Kuan-Han Sun, Rochester, N. Y., assignor to Eastman Kodak Company, Rochester, N. Y., a corporation of New Jersey No Drawing. Application August 9, 1946, Serial No. 689,526

14 Claims. (Cl. 106—47)

This invention relates to beryllo-aluminate optical glasses. These glasses have melting temperatures which are relatively low compared to those of the component oxides. While they melt at temperatures of the order of 1400° C., they are composed predominantly of oxide components having melting points higher than 1800° C. Moreover, the glasses are characterized by the fact that they have little or no ordinary glass formers such as the oxides of boron, silicon, germanium, or phosphorus.

A wide range of oxides such as are frequently used as components of glass are compatible with the oxides of aluminum and beryllium, in the absence of other glass formers. In general, the total amount of these two oxides is greater than 30 weight per cent or 45 mole per cent of the batch.

While both aluminum and beryllium oxides are well known glass components, I do not know of any instance where both have been used in a glass which was not primarily a silicate, borate, or phosphate glass. While I do not exclude the presence of a small amount of these glass formers, say up to 10 per cent, either weight or mole, I do not depend on their presence, and they are included with other known glass components.

The other components which I have found most useful in these glasses are oxides, and the range of proportions both in weight and in mole per cent, indicated by W and C, respectively, are given in the following table:

Table I

| Oxide | W | C |
|---|---|---|
| Lanthanum | 0–35 | 0–15 |
| Calcium | 15–37 | 15–40 |
| Strontium | 0–24 | 0–15 |
| Barium | 0–33 | 0–15 |
| Magnesium | 0–12 | 0–15 |
| Zinc | 0–15 | 0–12 |
| Cadmium | 0–25 | 0–12 |
| Alkali | 0–11 | 0–12 |

Since the designations $Li_2O$, $La_2O_3$, $Ta_2O_5$, etc., are empirical, I find it more expedient, particularly in computing mole percentages, to use the forms $LiO_{0.5}$, $LaO_{1.5}$, $TaO_{2.5}$, etc.

In the following table are given five examples containing only the first four additional oxides mentioned, with their optical properties:

Table II

| | 1 | | 2 | | 3 | | 4 | | 5 | |
|---|---|---|---|---|---|---|---|---|---|---|
| | W | C | W | C | W | C | W | C | W | C |
| CaO | 33 | 35.9 | 31 | 34.5 | 34 | 35.4 | 26 | 27.6 | 18 | 19.9 |
| SrO | 6 | 3.5 | 6 | 3.6 | 6 | 3.4 | 6 | 3.5 | 5 | 2.9 |
| BaO | 10 | 4.0 | 11 | 4.5 | 12 | 4.6 | 12 | 4.6 | 12 | 4.8 |
| $LaO_{1.5}$ | 10 | 3.7 | 12 | 4.6 | 10 | 3.6 | 21 | 7.7 | 32 | 12.1 |
| BeO | 3 | 7.3 | 3 | 7.5 | 8 | 18.7 | 13 | 30.9 | 16 | 39.6 |
| $AlO_{1.5}$ | 38 | 45.5 | 37 | 45.3 | 30 | 34.4 | 22 | 25.7 | 17 | 20.7 |
| $n_D$ | 1.7016 | | 1.7052 | | | | 1.7453 | | 1.7707 | |
| $\nu$ | 43.8 | | 43.7 | | | | 44.4 | | 44.9 | |

I contemplate the addition of still other components in limited amounts to vary the optical properties, resistance to weathering and chemical action and other properties of the resulting glass. Five examples including other components follow in Table III. It is to be noted that there is considerable choice, both of the eight preferred oxides listed in Table I and also of the other components.

Table III

| | 6 | | 7 | | 8 | | 9 | | 10 | |
|---|---|---|---|---|---|---|---|---|---|---|
| | W | C | W | C | W | C | W | C | W | C |
| MgO | 2.4 | 4 | | | 3.5 | 5.1 | 3.2 | 5 | | |
| CaO | 25.3 | 30 | 37 | 40.0 | 24.2 | 25.3 | 22.0 | 25 | 34.0 | 37.0 |
| SrO | 6.2 | 4 | 4 | 2.3 | 16.9 | 9.6 | 8.2 | 5 | | |
| BaO | 11.3 | 5 | 6 | 2.4 | 13.2 | 5.0 | 12.1 | 5 | 14.0 | 5.6 |
| ZnO | | | | | 9.0 | 6.5 | | | | |
| CdO | | | | | | | 24.2 | 12 | 12.0 | 5.7 |
| $LaO_{1.5}$ | 7.2 | 3 | 10 | 3.7 | | | | | | |
| $InO_{1.5}$ | 6.2 | 3 | | | | | | | | |
| $TiO_2$ | 1.2 | 1 | | | | | | | | |
| $ZrO_2$ | 1.8 | 1 | | | | | | | | |
| $ThO_2$ | | | 2 | 0.5 | | | | | | |
| $CbO_{2.5}$ | 2.0 | 1 | | | | | | | | |
| $TaO_{2.5}$ | 3.3 | 1 | | | | | | | | |
| $BeO_{1.5}$ | 1.9 | 5 | 2 | 4.8 | 8.6 | 20.2 | 7.9 | 20 | 3.0 | 7.3 |
| $AlO_{1.5}$ | 31.2 | 40 | 39 | 46.3 | 24.6 | 28.3 | 22.4 | 28 | 37.0 | 44.4 |
| $n_D$ | | | 1.7024 | | | | | | | |
| $\nu$ | | | 43.4 | | | | | | | |

None of the above examples includes alkali metal oxides, but these may be used in limited quantities with the various oxides already mentioned. Examples including them are given in the following Table IV.

Table IV

|  | 11 | | 12 | | 13 | | 14 | | 15 | |
|---|---|---|---|---|---|---|---|---|---|---|
|  | W | C | W | C | W | C | W | C | W | C |
| $LiO_{0.5}$ | 3.6 | 12 |  |  |  |  | 1.0 | 4 | 1.0 | 4 |
| $NaO_{0.5}$ |  |  | 7.2 | 12 |  |  |  |  |  |  |
| $KO_{0.5}$ |  |  |  |  | 10.7 | 12 |  |  |  |  |
| MgO | 4.0 | 5 | 3.9 | 5 | 3.7 | 5 | 3.5 | 5 | 3.3 | 5 |
| CaO | 28.0 | 25 | 27.0 | 25 | 26.0 | 25 | 24.6 | 25 | 23.0 | 25 |
| SrO | 10.4 | 5 | 10.0 | 5 | 9.6 | 5 | 23.6 | 13 | 8.5 | 5 |
| BaO | 15.4 | 5 | 14.8 | 5 | 14.2 | 5 | 13.4 | 5 | 32.6 | 13 |
| BeO | 10.0 | 20 | 9.6 | 20 | 9.3 | 20 | 8.8 | 20 | 8.2 | 20 |
| $AlO_{1.5}$ | 28.6 | 28 | 27.5 | 28 | 26.5 | 28 | 25.0 | 28 | 23.4 | 28 |

It is to be noted that while all of the examples here given include, in addition to the alkali metal oxide, the oxides of magnesium, calcium, strontium, and barium, these are not each required, and other oxides may be used, in the presence of an alkali metal oxide.

The glasses herein described are rather fluid at the melting temperature. They have a very low coefficient of expansion, and some do not shatter even when formed in a cold mold and allowed to cool at room temperature. They are also highly resistant to attack of alkali metallic vapors.

Having thus described my invention, what I claim is:

1. Non-borate, non-phosphate, non-silicate, optical glass consisting of compatible oxides of which at least 1.5 weight per cent is beryllium oxide; at least 15 weight per cent is aluminum oxide; and the total of aluminum and beryllium oxides is at least 30 weight per cent.

2. Non-borate, non-phosphate, non-silicate optical glass consisting of compatible oxides of which at least 1.5 weight per cent is beryllium oxide; at least 15 weight per cent is aluminum oxide; and the total of aluminum and beryllium oxides is between 30 and 45 weight per cent.

3. A glass composition of which less than 10 per cent is borate, phosphate, and silicate, comprising is weight per cent the oxides of: calcium, 15 to 37; strontium, 0 to 24; barium, 0 to 33; lanthanum, 0 to 35; magnesium, 0 to 15; beryllium, 1.5 to 20; aluminum, 15 to 40; the total of berryllium and aluminum oxides being between 30 and 45 weight per cent.

4. A glass composition of which less than 10 per cent is borate, phosphate, and silicate, comprising in mole per cent the oxides of calcium, 15 to 40; strontium, 0 to 15; barium, 0 to 15; lanthanum, 0 to 15; magnesium, 0 to 15; beryllium, 4.5 to 40; aluminum, 20 to 50; the total of berryllium and aluminum oxides being between 45 and 65 weight per cent.

5. An optical glass having a low coefficient of expansion, not readily shatterable, and resistant to attack of alkali metallic vapors and comprising essentially the following oxides: magnesium, 2 to 5 weight per cent; calcium, 15 to 37 weight per cent; strontium, 6 to 24 weight per cent; barium, 6 to 33 weight per cent; beryllium, 1.5 to 20 weight per cent, aluminum, 15 to 40 weight per cent; the total of the beryllium and aluminum oxides being between 30 and 45 weight per cent and containing less than 10 per cent of borate, phosphate, and silicate.

6. A non-borate, non-silicate, non-phosphate optical glass comprising essentially the following oxides: magnesium, 2 to 5 weight per cent; calcium, 15 to 37 weight per cent; strontium, 6 to 24 weight per cent; barium, 6 to 33 weight per cent; beryllium, 1.5 to 20 weight per cent; aluminum, 15 to 40 weight per cent.

7. An optical glass comprising essentially the following oxides in the weight percentages as given: calcium, 15 to 37; strontium, 3 to 24; barium, 5 to 33; lanthanum, 5 to 35; beryllium, 1 to 20; aluminum, 15 to 40; the total aluminum and beryllium oxides being at least 30 and containing less than 10 per cent of borate, phosphate, and silicate.

8. An optical glass comprising essentially the following oxides in the mole percentages as given: calcium, 15 to 40; strontium, 2 to 15; barium, 2 to 15; lanthanum, 2 to 15; beryllium, 4 to 40; aluminum, 20 to 50; the total aluminum and beryllium oxides being at least 45 and containing less than 10 per cent of borate, phosphate, and silicate.

9. A non-borate, non-silicate, non-phosphate optical glass comprising essentially the following oxides in the weight percentages as given: calcium, 15 to 37; strontium, 3 to 10; barium, 5 to 15; lanthanum, 5 to 35; beryllium, 1 to 20; aluminum, 15 to 40.

10. A non-borate, non-silicate, non-phosphate optical glass comprising essentially the following oxides in the mole percentages as given: calcium, 15 to 40; strontium, 2 to 5; barium, 2 to 5; lanthanum, 2 to 15; beryllium, 4 to 40; aluminum, 20 to 50.

11. A non-silicate, non-phosphate, non-borate optical glass comprising essentially the following oxides: magnesium, 2 to 5 weight per cent; calcium, 15 to 37 weight per cent; strontium, 6 to 24 weight per cent; barium, 6 to 33 weight per cent; beryllium, 1.5 to 20 weight per cent; aluminum, 15 to 40 weight per cent; the total of the beryllium and aluminum oxides being between 30 and 45 weight per cent.

12. A glass composition comprising the following oxides: calcium, 15 to 37 weight per cent; strontium, 0 to 24 weight per cent; barium, 0 to 33 weight per cent; lanthanum, 0 to 35 weight per cent; magnesium, 0 to 15 weight per cent; cadmium, 0 to 25 weight per cent; zinc, 0 to 10 weight per cent; beryllium, 1.5 to 20 weight per cent; aluminum, 15 to 40 weight per cent; the total of beryllium and aluminum oxides being between 30 and 45 weight per cent and containing less than 10 per cent of borate, phosphate, and silicate.

13. An optical glass consisting in weight per cent of the oxides of magnesium, 2.4; calcium, 25.3; strontium, 6.2; barium, 11.3; lanthanum, 7.2; indium, 6.2; titanium, 1.2; zirconium, 1.8; columbium, 2.0; tantalum, 3.3; beryllium, 1.9; aluminum, 31.2.

14. An optical glass having a low coefficient of expansion, not readily shatterable, and resistant to attack of alkali metallic vapors, consisting of compatible oxides and characterized by the presence, as the predominant glass formers, of beryllium oxide in an amount between 1.5 and 20 per cent by weight and aluminum oxide in an amount between 15 and 40 per cent by weight, the total of beryllium and aluminum oxides being between 30 and 45 per cent by weight.

KUAN-HAN SUN.

REFERENCES CITED

The following references are of record in the file of this patent:

UNITED STATES PATENTS

| Number | Name | Date |
|---|---|---|
| 2,241,249 | Eberlin | May 6, 1941 |